J. L. G. RAHDER.
SHAFT COUPLING.
APPLICATION FILED MAR. 5, 1910.
982,299.
Patented Jan. 24, 1911.
3 SHEETS—SHEET 1.
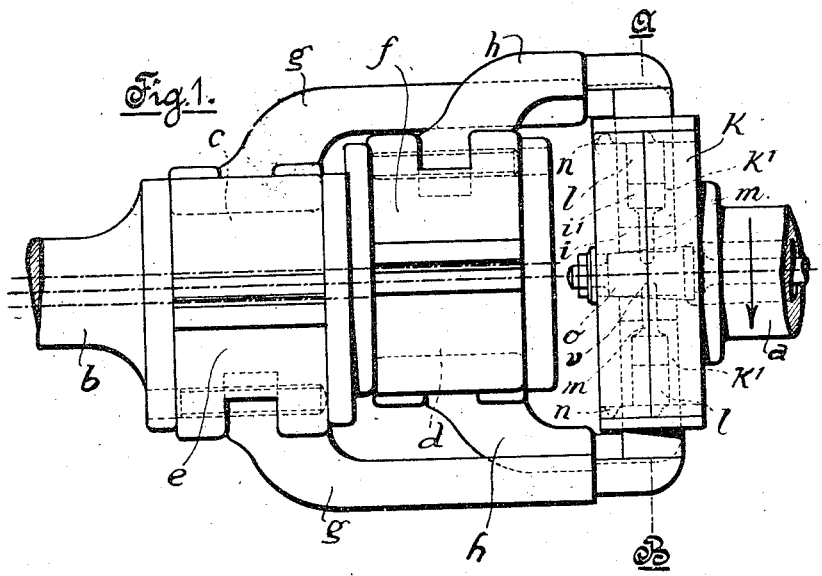
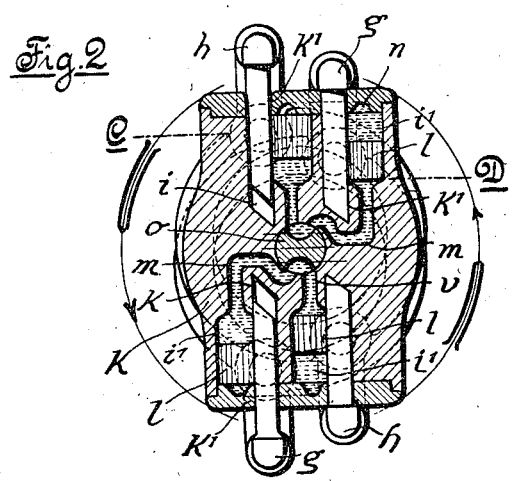
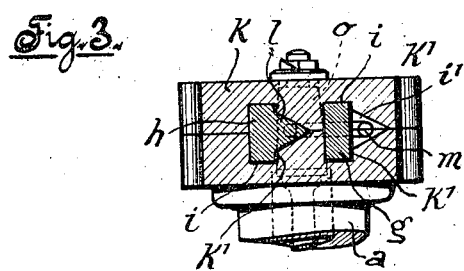

J. L. G. RAHDER.
SHAFT COUPLING.
APPLICATION FILED MAR. 5, 1910.

982,299.

Patented Jan. 24, 1911.

3 SHEETS—SHEET 2.

UNITED STATES PATENT OFFICE.

JEAN LOUIS GÉRARD RAHDER, OF DUSSELDORF, GERMANY.

SHAFT-COUPLING.

982,299. Specification of Letters Patent. Patented Jan. 24, 1911.

Application filed March 5, 1910. Serial No. 547,409.

*To all whom it may concern:*

Be it known that I, JEAN LOUIS GÉRARD RAHDER, a citizen of the Netherlands, and residing at Dusseldorf, Germany, have invented new and useful Improvements in Shaft-Couplings, of which the following is a specification.

This invention relates to a hydraulic shaft-coupling of novel construction and comprises more particularly novel and effective means for controlling the flow of the power transmitting liquid and for preventing leakage.

Figure 4:
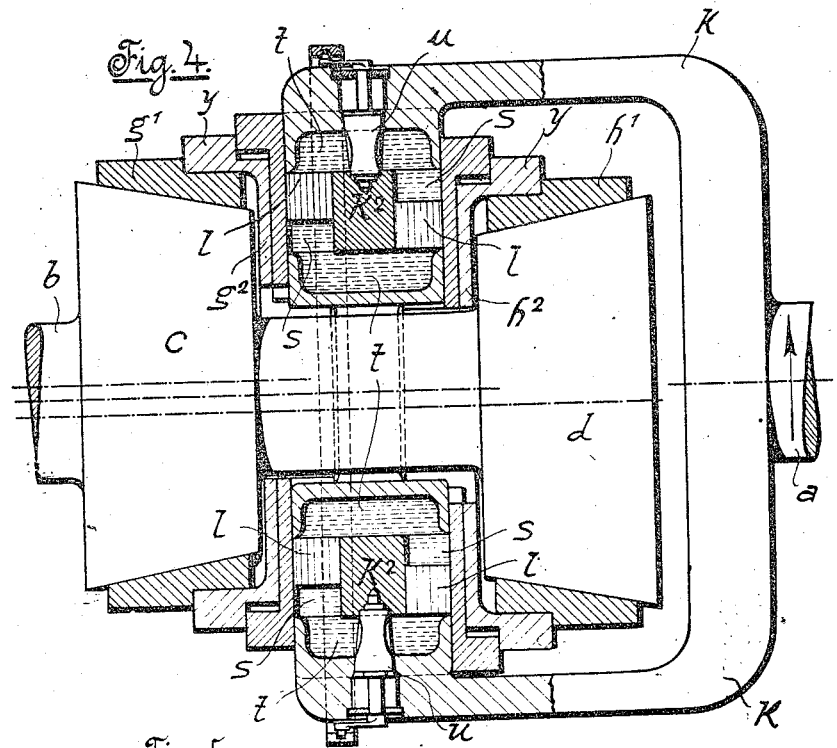
Figure 5:
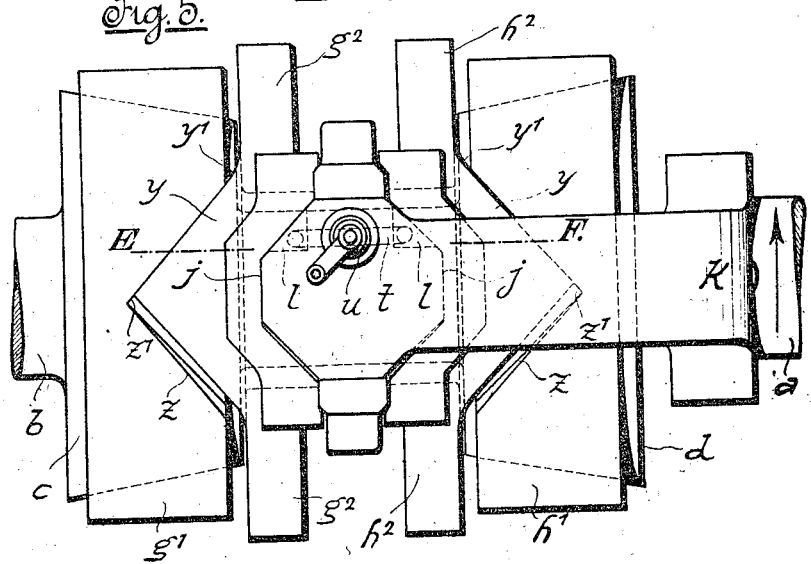
Figure 6:
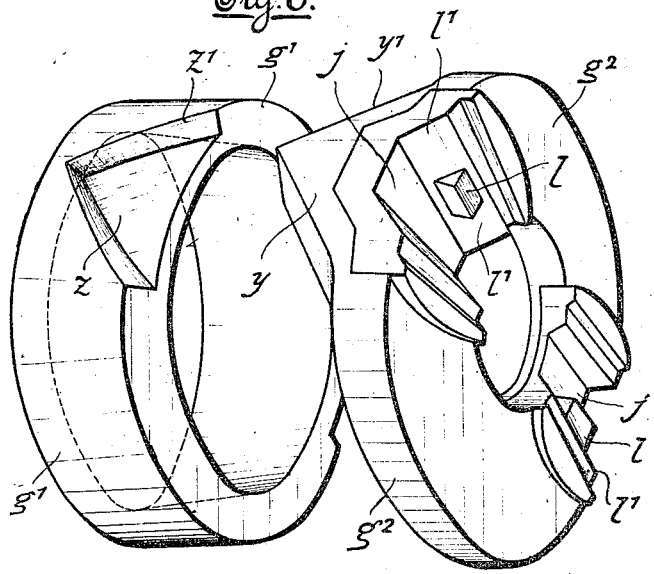

In the accompanying drawings: Figure 1 is a side view of my improved shaft-coupling; Fig. 2 a cross section on line A—B, Fig. 1; Fig. 3 a horizontal section on line C—D, Fig. 2; Fig. 4 a longitudinal section on line E—F, Fig. 5, illustrating a modification of the coupling; Fig. 5 a side view thereof; Fig. 6 a detail of one of the conical sleeves and coöperating parts, and Fig. 7 a detail of part of the wedge-carrier.

The shaft $b$ to be coupled to the driver shaft $a$ is provided with a pair of crank pins $c$, $d$ arranged out of axial alinement with each other. These pins carry rotatable members $e$, $f$ having at both extremities arms $g$, $h$ pivoted thereto, which engage slots of a gripper-disk $k$ of the shaft $a$. Consequently, on turning this shaft, the members $e$, $f$ are taken along with the arms $g$, $h$ in which operation, however, they can move inward and outward, corresponding to the eccentricity of the crank pins. The arrangement is such a one that the members $e$, $f$ are always shifted in opposite directions. The arms $g$, $h$ engaging the slots $i$ carry lateral piston-like extensions $l$, with which they pass up into chambers or slots $i'$. The extensions $l$ are cuneiform and the slots have this shape as well, as shown in Fig. 3. The chambers or guide-slots of two adjacent disks are connected by ducts $m$, $n$, the centrally disposed ducts $m$ opening into junctional ducts $v$ provided in the shaft $a$. The ducts $m$ are filled by a supply-pipe arranged in the shaft $a$ and the filling of the ducts $n$ takes place by a supply-pipe provided on the outside of the gripper-disk. For filling water or another liquid may be used. In this manner both sides of the pistons $l$ are surrounded with liquid within the chambers $i'$. If on the rotation of the shaft $a$ the member $e$ with the arm $g$ and the piston is moved inwardly, the member $f$ with the arm $h$ and the pistons is moved outwardly, and consequently the water displaced by that piston can escape into the space voided by this piston. If, however, by turning the plug $o$ of the cock arranged in the shaft $a$ the passage from the one duct to the other is interrupted, the water can no longer be displaced; thus checking the movement of members $e$, $f$; in this manner the same are stabilized on their crank pins, so as to transmit rotary movement from shaft $a$ to shaft $b$. As shaft $a$ is rotated in the direction of the arrow, the gripper-disk $k$ with the cuneiform faces of their slots $i'$ is being pressed close to the cuneiform faces of the pistons $l$, and its faces $k'$ bear against the arms $g$, $h$. Thus the chambers or slots $i'$ are kept tightly closed on all sides so as to prevent any liquid from leaking out of the chamber outwardly intermediate the faces of the gripper-disk $k$ limiting the slots $i'$ and the arms $g$, $h$. The packing of the arms $g$ and $h$ is effected automatically during the operation without any stuffing boxes being necessary as in the known couplings of the same class. Likewise no danger exists of its getting leaky by wear and tear as during service the gripper-disk $k$ is always pressed against arms $g$, $h$ thus insuring a tight fit of the parts.

Figure 7:
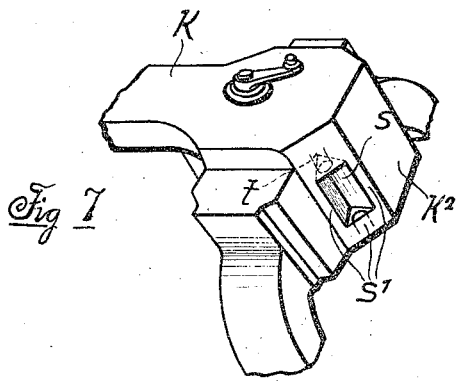

In the modification shown in the Figs. 4 to 6 the cranks $c$, $d$ arranged eccentrically relative to the shaft $b$ and to each other have a conical form and the members, carried thereby and fitted with the pistons, consist of two parts. The cranks $c$, $d$ are encompassed by tapering sleeves $g'$, $h'$, provided with cuneiform recesses $z$. The latter are engaged by triangular keys $y$, of a pair of disks $g^2$, $h^2$. These disks have recesses $j$, and the piston-shaped extensions $l$, laterally projecting in these recesses. The shaft $a$ has placed thereon the carrier-bodies $k$ which pass up with the arms $k^2$, as shown in Fig. 7, intermediate the disks $g^2$ and $h^2$ and into the recesses $j$. The arms $k^2$ have slots $s$, with which they embrace the pistons $l$.

In Fig. 7 the body $k$ with the arm $k^2$ is drawn in such a way that it must be turned in horizontal direction through 180° to permit its being pushed into the recesses $j$ and with the slot $s$ over the piston $l$. It has been represented in this way in order to show the slot $s$. The piston $l$ and the slot are kept in cuneiform engagement. The slots $s$ are connected by means of ducts $t$ fit to be closed by plugs $u$. On the rotation of the shaft $a$ the member $k$ assisted by the arms $k^2$ takes along the disks $g^2$ and $h^2$ and sleeves $g'$, $h'$, thereby reciprocating the pistons $l$ in slots $i$ corresponding to the eccentricity of the pivots. In order that, when the shift takes place, the disks $g^2$ and $h^2$ may not jam with the parts overlapping the arms $h^2$ these special parts, provided with the recesses $j$ are so inserted into the disks $g^2$ and $h^2$ respectively, as to allow their rotation conveniently. If by closing the plugs $u$ the water contained in the slots or chambers $s$ is prevented from escaping, the parts $g'$, $g^2$ and $h'$, $h^2$ are clamped to the cranks, thereby effecting the rotation of the shaft $b$. The shaft $a$ rotates in the direction of the arrow; so that the faces $s'$ placed laterally and above the slots $s$ are pressed close to the faces $l'$ arranged by the side of the piston. In this way the slots $s$ are closed on all sides tightly and no liquid can come away outwardly intermediate the faces $s'$ and $l'$.

If a shift of the sleeves $g'$ and $h'$, carried by the cuneiform cranks, takes place, they are forced outwardly by means of the disks $g^2$ and $h^2$. This is effected by their being slightly twisted relative to the sleeves and their being pushed with one surface $v'$ of their cuneiform extensions past the faces $z'$ of the recesses $z$. In this way the adjustment of the parts is effected automatically when they wear away and consequently their slackening relative to one another and to the pivots $c$, $d$ cannot occur.

In place of being cuneiform, the pistons $l$ and the chambers $i'$ and $s$ respectively may also be shaped rectangular, circular or the like. It is only necessary that during the operation the faces provided laterally and above and below the slots are pressed close to the faces arranged around the pistons.

When one of the shafts is fixed in position, the contrivance may also be used as a brake; for, on closing the ducts the other shaft is stopped up as well or, if the ducts are only partly closed, its movement is checked. By shutting off only partly the passage-ducts also the second shaft can be permanently actuated at a lesser speed from the driven shaft.

I claim:—

1. In a liquid-controlled shaft coupling, a head carried by the driver shaft and having a pair of communicable chambers and adjoining slots, a pair of crank pins on the driven shaft, arms operatively connected to the crank pins and engaging said slots, and pistons on said arms that engage the chambers.

2. In a liquid-controlled shaft coupling, a head carried by the driver shaft and having a pair of communicable chambers which are provided with cuneiform sides, a pair of crank pins on the driven shaft, and cuneiform pistons operably connected to the crank pins and adapted to be pressed liquid-tight against the cuneiform chamber-sides upon a rotation of the head.

3. In a liquid-controlled shaft coupling, a head carried by the driver shaft and having a pair of chambers which are provided with cuneiform sides, a duct connecting said chambers, a valve plug controlling said duct, a pair of crank pins on the driven shaft, and cuneiform pistons operably connected to the crank pins and adapted to be pressed against the cuneiform chamber sides upon a rotation of the head.

4. In a liquid-controlled shaft coupling, a head carried by the driver shaft and having a pair of communicable tapering chambers and adjoining oblong slots, the width of said slots exceeding that of the base of the tapering chambers whereby straight faces are formed that flank the chambers, a pair of crank pins on the driven shaft, arms of oblong cross section operatively connected to said pins and engaging the slots, and tapering pistons on said arms, that engage the chambers, the arms and pistons being adapted to be pressed against the slot-faces and the chamber-sides respectively upon a rotation of the head.

J. L. GÉRARD RAHDER. [L. S.]

Witnesses:
  OTTO KÖNIG,
  CHAS. J. WRIGHT.